United States Patent [19]
Neff

[11] Patent Number: 5,931,956
[45] Date of Patent: Aug. 3, 1999

[54] DIGITAL CIRCUIT USING MEMORY FOR MONITORING SIGNALS FOR OCCURRENCES OF PREDEFINED BREAKPOINT CONDITIONS

[75] Inventor: H. W. Neff, Castro Valley, Calif.

[73] Assignee: Atmel Corporation, San Jose, Calif.

[21] Appl. No.: 08/872,822

[22] Filed: Jun. 10, 1997

[51] Int. Cl.⁶ ..................................................... G06F 11/22
[52] U.S. Cl. ............................................. 714/34; 714/35
[58] Field of Search ........................... 395/183.13, 183.1, 395/183.11, 185.02

[56] References Cited

U.S. PATENT DOCUMENTS

| | | | |
|---|---|---|---|
| 4,338,660 | 7/1982 | Kelley et al. ......................... | 395/183.1 |
| 4,675,646 | 6/1987 | Lauer .................................... | 395/183.1 |
| 5,249,278 | 9/1993 | Krauskopf ............................. | 395/400 |
| 5,371,894 | 12/1994 | DiBrino ................................ | 395/183.1 |
| 5,440,700 | 8/1995 | Kaneko ................................. | 395/183.1 |
| 5,704,034 | 12/1997 | Circello ............................... | 395/183.14 |
| 5,717,851 | 2/1998 | Yishay et al. ....................... | 395/183.11 |
| 5,841,670 | 11/1998 | Swoboda ................................ | 364/578 |

*Primary Examiner*—Joseph E. Palys
*Assistant Examiner*—Scott T. Baderman
*Attorney, Agent, or Firm*—Thomas Schneck; Mark Protsik

[57] ABSTRACT

A breakpoint unit contains a memory circuit which monitors digital signals for the occurrence of any of a plurality of predetermined conditions. The memory circuit includes an array of memory cells (each cell storing data determining a value of a breakpoint condition of interest), and selected ones of the cells can be read in response to various combinations of the signal bits. In some embodiments, the array includes $2^N$ cells and data stored in each cell is readable in response to N binary signal bits which are treated as an N-bit address signal. The memory circuit outputs the accessed data value from one memory cell, which would be used as a breakpoint signal that halts or initiates operation of the circuit originating the signals being monitored.

16 Claims, 3 Drawing Sheets

DIGITAL CIRCUIT USING MEMORY FOR MONITORING SIGNALS FOR OCCURRENCES OF PREDEFINED BREAKPOINT CONDITIONS

TECHNICAL FIELD

The present invention relates to digital circuits known as breakpoint units that observe or monitor one or more signals, such as those produced by digital signal processors, microcontrollers and logic analyzers, and that provide real-time notification, usually in the form of a breakpoint signal for halting (or initiating) operation of the chip whose signals are being monitored, upon the occurrence of a predefined condition in the set of signals being monitored.

BACKGROUND ART

It is known to monitor a set of one or more digital signals produced by digital signal processors, microcontrollers, logic analyzers and other circuits for the occurrence of any of several predetermined conditions, i.e. combination of signal values, in the set. In the case of logic analyzers, manufacturers normally include a trace buffer memory in the device for simply recording the signal states for some specified set of signals over the most recent clock cycles, thereby providing a trace history that can be later analyzed if some problem occurs. The size of the buffer determines the exact number of recent cycles that can be stored, and generally, no real-time notification of any predefined condition in the monitored signals is given. In the case of some other circuits, such as digital signal processors (DSP), it is common to generate a breakpoint (or halt) signal in response to the detection of a predefined condition in a set of signals being monitored by a breakpoint unit. The operation of the DSP, microcontroller, or other circuit is then immediately halted in the same clock cycle, so that a programmer or other user can analyze the internal state of the circuit, including for example the values contained in the various registers of the circuit, in an effort to identify the programming or other error that caused the condition to occur. One example of a specific condition of interest to be monitored for is an attempt to access a memory at an address that is outside a predetermined range. In microcontrollers, DSPs and the like, a start-up or bootstrap routine is usually executed when power is first turned on to preset registers and other circuit elements to a desired initial state. The breakpoint unit can monitor signals during the routine for certain signal states that indicate that the start-up cycle is complete. A "breakpoint" signal generated by the unit may then initiate normal operation of the circuit.

Conventional breakpoint units use dedicated comparator circuits, each operating on the set of signals being observed to detect the occurrence of some condition for those signals and to output an indication of any such detected occurrence. An example of such a breakpoint unit with two comparators is illustrated in FIG. 1. Each comparator is dedicated to detecting a different signal condition, and in practice there may be as many as 16 comparators in a breakpoint unit for detecting a like number of conditions. In FIG. 1, the breakpoint unit includes a first comparator 2, a second comparator 4 and an inclusive OR gate 6. The comparators 2 and 4 receive as inputs a set of signals $B_1, B_2, \ldots, B_N$ to be monitored. These signals may represent, for example, attempts by a digital signal processor, microcontroller, logic analyzer or other circuit to access instructions from a program memory or to access data to or from one or more data memories at certain addresses, or may represent other outputs from or inputs to these circuits. Thus, the comparator inputs may represent memory addresses, data, error flags (such as overflow) and other signals. While FIG. 1 shows both comparators 2 and 4 receiving the same signals $B_1, B_2, \ldots, B_N$, different comparators might receive and thereby monitor different or overlapping sets of signals. The first comparator 2 receives, or has stored internally, a set of reference signals $R_1, R_2, \ldots, R_N$ equal in number and corresponding to the signals $B_1, B_2, \ldots, B_N$ being monitored. The reference signals $R_1, R_2, \ldots, R_N$ represent the signal values for the condition to be detected. When each of the input signals $B_i$ (i=1 to N) matches its corresponding reference signal $R_i$, the comparator 2 outputs an indication signal $I_1$ with a logic level "1" representing an occurrence of the condition being sought in the input signals $B_1, B_2, \ldots, B_N$ being monitored. Otherwise, the comparator 2 outputs a logic level "0" for the indication signal $I_1$. Similarly, the second comparator 4 receives, or has stored internally, a different set of reference signals $R_1', R_2', \ldots, R_N'$, representing a different condition for the input signals $B_1, B_2, \ldots, B_N$ being monitored. The comparator 4 outputs a second indication signal $I_2$, which is a logic level "1" if the condition is detected and a logic level "0" whenever the condition is not detected.

The results of the comparisons may be individually used, as shown for first indication signal $I_1$. For example, one indication signal may signal a desired starting condition, while some other indication signal may signal a desired stopping condition. Alternatively, two or more indication signals may be combined in some logical fashion by one or more logic gates. For example, in FIG. 1, the first and second indication signals $I_1$ and $I_2$ output by the comparators 2 and 4 are input into an inclusive-OR gate 6. A third indication $I_3$ is output by the gate 6 and indicates the occurrence of either condition of interest.

A typical comparator 8 is implemented as shown in FIG. 2. The comparator includes a set of exclusive-NOR (XNOR) or exclusive-OR gates $10_1, 10_2, \ldots, 10_N$, one for each of the N input signals $B_1, B_2, \ldots, B_N$ to be monitored and compared with reference values $R_1, R_2, \ldots, R_N$. The reference values $R_1, R_2, \ldots, R_N$ may be stored in an N-Bit register 12. Thus, each XNOR logic gate $10_1, 10_2, \ldots, 10_N$ receives two inputs, one an input signal $B_i$ (i=1 to N) and the other a corresponding reference signal $R_i$. Each gate outputs the result of its bit-comparison. The comparator also includes a set of (N−1) two-input AND gates $14_1, 14_2, \ldots, 14_{N-1}$. (An N-input AND gate could be used in their place if N is not too large.) The result of combining all N bit-comparison results is output as the indication signal $I_j$ for this j-th comparator 8 of the breakpoint unit. This implementation normally limits comparisons to 8-bit input signals, or in extreme cases possibly to 16-bit input signals. Further, each comparator is usually implemented on a separate integrated circuit chip.

Prior breakpoint units are limited in practice to a small number of user definable conditions, since the conventional approach allows only a single match condition for each dedicated comparator device. Thus prior units only allow a user to detect and act upon a small number of simple conditions of interest. With 16 comparators, for example, a breakpoint unit is capable of monitoring a DSP's access to eight program memory addresses, four data memory addresses and four data values (i.e., accessed memory contents). Complicated logical combinations of several operating conditions are prohibitively expensive, so only simple combinations are attempted. For example, one possible combination for conventional units is: IF ANY OF ADDRESS EQUALS 42 OR ADDRESS EQUALS 85 OR DATA EQUALS 22 OR DATA EQUALS 27, THEN STOP. Further, even with these limited monitoring capabilities, the comparator/logic circuit requirements generally dictate an off-chip breakpoint unit separate from the device being monitored.

An objective of the present invention is to provide apparatus capable of monitoring sets of signals for an arbitrarily large number of defined conditions or condition classes and to providing real-time notification for beginning or halting operation of a circuit upon detection of the occurrence of any one or more of those conditions in a monitored signal set or sets.

Another objective of the present invention is to provide an efficient way of providing the above-mentioned notification for logical combinations of defined signal conditions.

Yet another objective of the present invention is to provide the above-mentioned apparatus in which the defined conditions can be readily reprogrammed.

DISCLOSURE OF THE INVENTION

The above objectives are met by a breakpoint unit that uses memory in place of the comparators in prior units and that treats the signals being monitored as address bits accessing at least one memory chip. The conditions, i.e. signal combinations, being watched for can then be represented by programmed bits at the corresponding memory locations. Thus, all signal combinations of interest are treated as addresses of interest, and the memory output indicates whether any of the signal conditions that are sought have occurred, since any such occurrence accesses one or more programmed indication bits at the corresponding address in the memory and cause that bit or bits to be output by the memory. The programmed memory thus contains a map of the conditions of interest.

The memory may be 1-bit wide memory for indicating one class of conditions being monitored or may be multi-bit wide memory (providing a multi-bit output) for defining separate condition classes. The memory outputs can be used as indication or breakpoint signals themselves or can be logically combined. A second memory stage may be used to carry out complex combinations of the indication signals in place of the usual logic gates. A counter can be used to receive indication signals as they occur and generate a breakpoint signal only after some specified number of conditions have occurred.

Circuits whose associated digital signals can be monitored by the breakpoint unit include digital signal processors, microcontrollers, logic analyzers, other digital circuits and even hybrid analog-digital circuits. The signals may represent one or more of inputs to, outputs from, and internal operating states of the circuit (such as register values), as well as accesses or attempted accesses by the monitored circuit of program or data memory or of some other circuit along a bus. If plural memory chips are used in the breakpoint unit, each chip may receive and thereby monitor the same set of signals or distinct subsets of all the signals (whether overlapping or completely separate) for different condition classes.

The breakpoint unit of the present invention allows detection of any one or more of an arbitrarily large number of defined conditions, dependent only on the size of the memory, where such conditions may be used individually or grouped severally into larger condition classes or combinations of conditions. Further, the invention replaces the many comparator chips of limited capability with a memory chip or chips, each of much greater capability. Moreover, the memory is readily reprogrammed, even during operation if desired. Other advantages can be seen from description of the preferred embodiments.

DETAILED DESCRIPTION OF THE PREFERRED EMBODIMENTS

Figure 1:
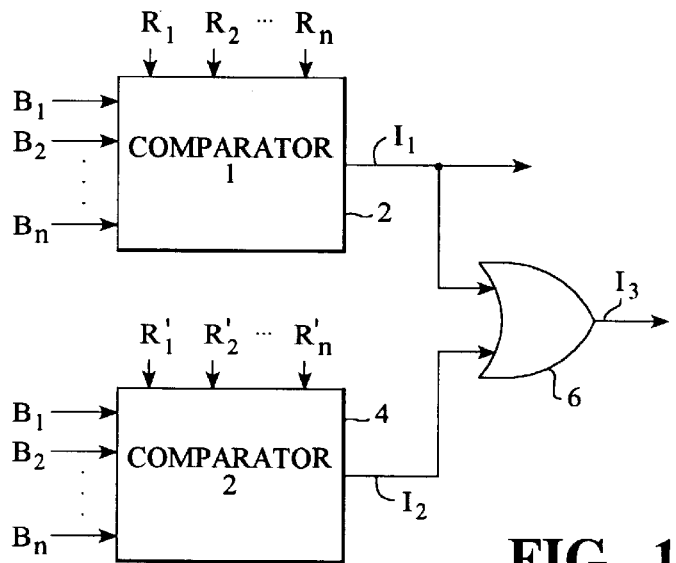
FIG. 1 is a block diagram of a conventional breakpoint unit of the prior art using comparator circuits for generating a breakpoint signal.
Figure 2:
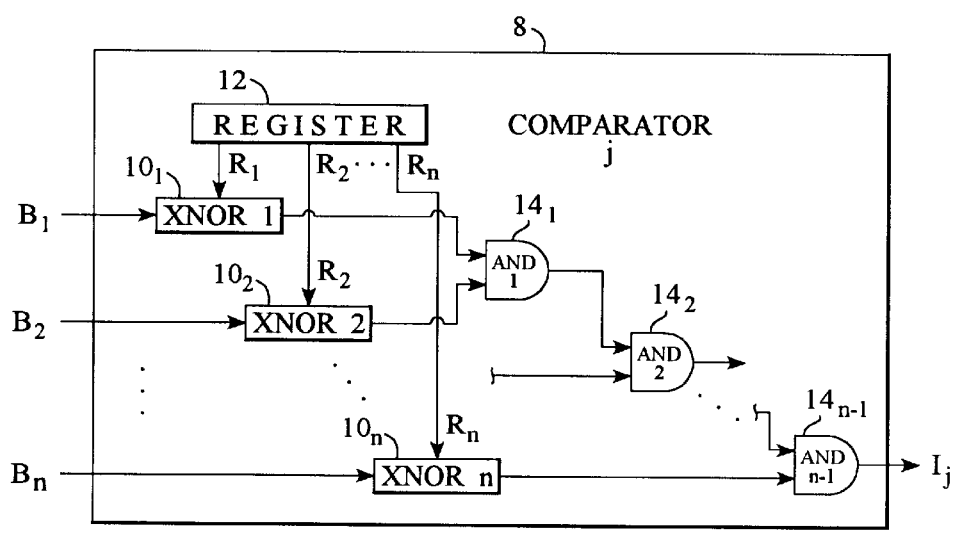
FIG. 2 is a block diagram of a conventional implementation of one comparator of the FIG. 1 circuit.

While the breakpoint unit described below is illustrated in its application to digital signal processor (DSP) monitoring, it should be understood that the breakpoint unit of the present invention can also be used to monitor digital signals in or from other circuits, including, but not limited to, microcontrollers and logic analyzers. Further, while it is expected that most of the circuits to be monitored with the inventive breakpoint unit will be completely digital, it should be understood that digital signals in or from hybrid analog-digital circuits can also be monitored with the invention. Also, signals being input into circuits could be monitored as well.

In a preferred embodiment, the invention is a system including a digital signal processor (DSP) or other digital circuit which asserts N status bits or other signal outputs (where N is an integer and each bit or output signal is indicative of a state or operating condition of a node or element of the DSP), and a memory circuit which receives the N bits from the DSP. The memory circuit (preferably a random access memory) includes an M×1 array of memory cells (each cell storing data determining a value of a breakpoint signal for the DSP), and means for reading any selected one of the cells in response to the N status bits. In preferred embodiments in which each status signal is a binary signal, $M=2^N$. The status bits function as, and will sometimes be referred to as an N-bit "address" signal (the N-bit address signal indicates an operating condition of the DSP). In preferred implementations, the memory circuit asserts the contents of one of its memory cells to the DSP (as a breakpoint signal) in response to each address signal, and the DSP halts one of its operations in response to each such breakpoint signal having a first value. In alternative embodiments, the above-mentioned DSP is replaced by some other circuit which asserts status bits to a memory circuit, and which includes means for processing a breakpoint signal (where the breakpoint signal is generated by the memory circuit in response to the status bits).

Other embodiments of the invention are breakpoint signal generation methods which can be implemented by the described systems.

In preferred embodiments, the system of the invention employs a single RAM chip (including an M×1 array of memory cells) to assert a breakpoint signal having a level (e.g. a logical "1" or "0" level) for each combination of values of a set of N status bits, where N is a large number (and M=$2^N$, in preferred embodiments), and the value of each status bit is indicative of a state or operating condition of a node or element of a first circuit. In another class of preferred embodiments, the system of the invention employs a small number of RAM chips and simple logic circuitry to assert a breakpoint signal having a level (e.g. a logical "1" or "0" level) for each combination of values of an even larger set of status bits, where the value of each status bit is indicative of a state or operating condition of a node or element of the circuit.

In a class of preferred embodiments (such as that of FIG. 3), the invention is a system including a digital signal processor (e.g., DSP 20 of FIG. 3), and a single RAM chip (e.g., RAM chip 30 of FIG. 3) for asserting a breakpoint signal (e.g. binary signal $I_i$ of FIG. 3) for halting operation of the DSP under predetermined conditions.

Figure 3:
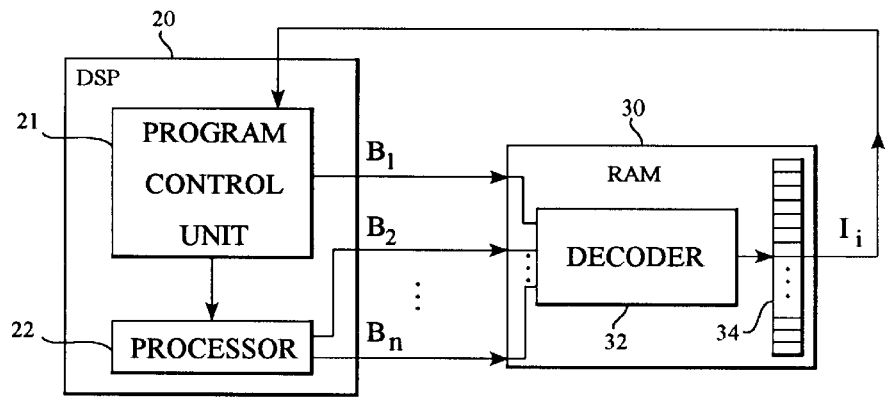
FIG. 3 is a block diagram of a preferred embodiment of the system of the invention, including random access memory chip 10 (for generating a breakpoint signal) and digital signal processor chip 60.

DSP 20 of FIG. 3 includes (or can access) a program memory (not shown in FIG. 3), a program control unit ("PCU") 21 for fetching and decoding instructions from the program memory (thereby generating control signals for controlling execution of the instructions), and a processing unit 22 for performing operations (e.g., arithmetic computations) on data in response to the control signals from PCU 21.

DSP 20 includes means for asserting binary status bit signals $B_1$ through $B_N$ (where of N is a number greater than 1) which are monitored by RAM 30. The value of each status bit (the status bit determined by each status bit signal) is indicative of a state or condition of one node or element of DSP 20, and thus the N status bits determined by signals $B_1$ through $B_N$ are collectively indicative of an operating condition of DSP 20.

For convenience, the expression "a status bit indicative of a state" of a circuit will be used below (including in the claims) to denote "a status bit indicative of a state or condition of a node or element" of the circuit. The "state" of the circuit should be understood to include the signals being input or received by the circuit, signals being output from the circuit, including data signals, attempts by the circuit to access program or data memory or to communicate with or control operation of other circuits, the state of handshake signals and error or other flags, and not only the states of various internet registers and operating modes of various internal circuit elements.

As indicated in FIG. 3, PCU 21 of DSP 20 asserts status bit signal $B_1$ ($B_1$ is indicative of a state of PCU 21), and processing unit 22 asserts status bit signals $B_2$–$B_N$ ($B_2$–$B_N$ are indicative of states of unit 22). It is contemplated that in variations on the FIG. 3 embodiment, status bit signals $B_1$–$B_N$ are indicative of any of a wide variety of states or conditions of some or all nodes or components of DSP 20.

Each of status bit signals $B_1$–$B_N$ has a value which is variable with time. Status bit signals $B_1$–$B_N$ are supplied in parallel to an address decoder unit 32 of RAM 30, as an N-bit address signal. RAM 30 also includes memory cell array 34. Array 34 is an M×1 array consisting of M memory cells. One binary bit can be stored in each cell of array 34. At any instant, bit signals $B_1$–$B_N$ determine an N-bit binary value ($B_1$ determines the most significant bit thereof and determines the least significant bit thereof), which corresponds to the address of one cell of array 34. The N-bit binary value of signals $B_1$–$B_n$ at any instant of time is also indicative of an operating condition of DSP 20 (the operating condition determined by the state or condition of the N nodes or elements of DSP 20 from which signals $B_1$–$B_N$ originate). Decoder 32 selects a different cell of array 34 in response to each N-bit binary value determined by signals $B_1$–$B_N$. RAM 30 asserts the contents of the selected cell (binary signal $I_i$) to PCU 21 (of DSP 20) as a breakpoint signal. PCU 21 halts an operation (or some or all operations) of DSP 20 in response to each such breakpoint signal having a particular value.

In one example, in response to binary breakpoint signal $I_i$ having a level indicative of a logical "1", PCU 21 halts an operation (or some or all operations) of DSP 20. In this example, breakpoint signal $I_i$ causes a halt of an operation of DSP 20 whenever address signal $B_1$–$B_N$ selects a cell of array 34 which stores a logical "1" bit. Typically, many of the cells of array 34 store data indicative of a logical "0", and the remaining cells of array 34 store data indicative of a logical "1".

Figure 4:
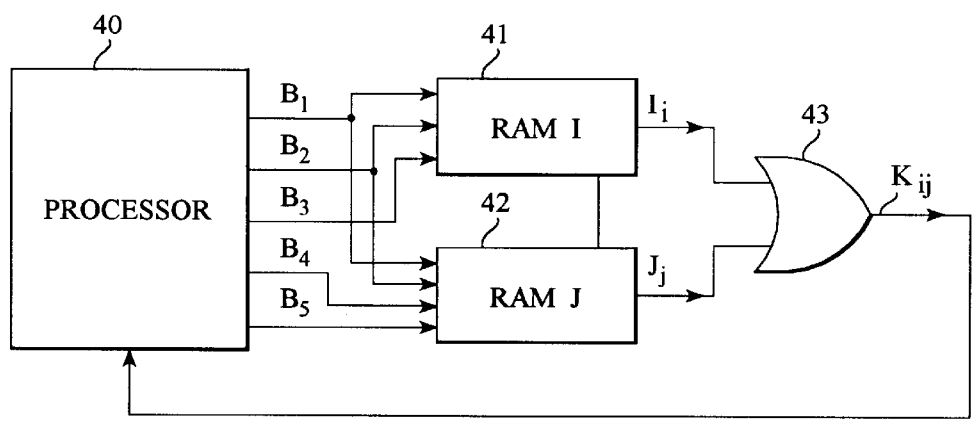
FIG. 4 is a block diagram of another embodiment of the system of the invention, including a multi-chip RAM circuit (which alternatively can replace RAM chip 10 of FIG. 3 in a variation on the FIG. 3 system) and processor 19.

FIG. 4 is an alternative embodiment of the inventive system, including processor 40 and multi-chip RAM circuitry comprising a first RAM chip 41 (including a $2^P$×1 array of memory cells), a second RAM chip 42 (including a $2^Q$×1 array of memory cells), and inclusive OR gate 43, connected as shown. The multi-chip RAM circuitry of FIG. 4 can alternatively be used to replace RAM chip 30 of FIG. 3 (or RAM chips 92–100 and logic circuitry 102 of FIG. 7). In FIG. 4, processor 40 is preferably an integrated circuit which includes a state machine (rather than a program memory and program control unit as does DSP 20 of FIG. 3) for asserting a sequence of internal control signals in response to an instruction from an external device (not shown).

To simplify the description of the FIG. 4 circuit, we consider an implementation in which P=3 (so that RAM 41 has eight memory cells) and Q=4 (so that RAM 42 has sixteen memory cells). In this implementation, bit signals $B_1$, $B_2$, and $B_3$ are asserted in parallel from processor 40 as an address signal to first RAM 41, and in response RAM 40 asserts the contents (binary signal $I_i$) of the cell selected by each such address signal. Similarly, bit signals $B_1$, $B_2$, $B_4$, and $B_5$ are asserted in parallel from processor 40 as an address signal to second RAM 42, and in response RAM 42 asserts the contents (binary signal $J_j$) of the cell selected by each such address signal. Signals $I_i$ and $J_j$ are supplied to the two inputs of OR gate 43. In response to each pair of signals $I_i$ and $J_j$, gate 43 asserts breakpoint signal $K_{ij}$. Since the memory array of RAM 41 has eight cells (each selected by a different value of a 3-bit address signal) and that of RAM 42 has sixteen cells (each selected by a different value of a 4-bit address signal), breakpoint signal $K_{ij}$ has a value determined by one of 128 possible combinations of the bits of the address signals, and thus the value of breakpoint signal $K_{ij}$ is indicative of one of 128 possible operating conditions of processor 40. In typical implementations in which $I_i$ and $J_j$ are binary signals, signal $K_{ij}$ is also a binary signal.

In variations on the FIG. 4 embodiment, the inventive system includes various combinations of memory circuits (preferably RAM chips) whose outputs are supplied to logic circuitry. The breakpoint signal of the invention is asserted at the output of the logic circuitry, and is indicative of some logical combination of the operating conditions indicated by the address signals supplied from a circuit being monitored (e.g, a DSP) to the memory circuits. Alternatively, the logic circuitry is omitted and multiple breakpoint signals are asserted directly from the memory circuits to the DSP (or other circuit from which the address signals originate). Each memory circuit in any of the embodiments of the inventive system can include a one-bit wide cell array (as in the above-described implementation of RAMs 30, 41, and 42) or a cell array that is two or more bits wide (as in the embodiment to be discussed below with reference to FIG. 5).

Figure 5:
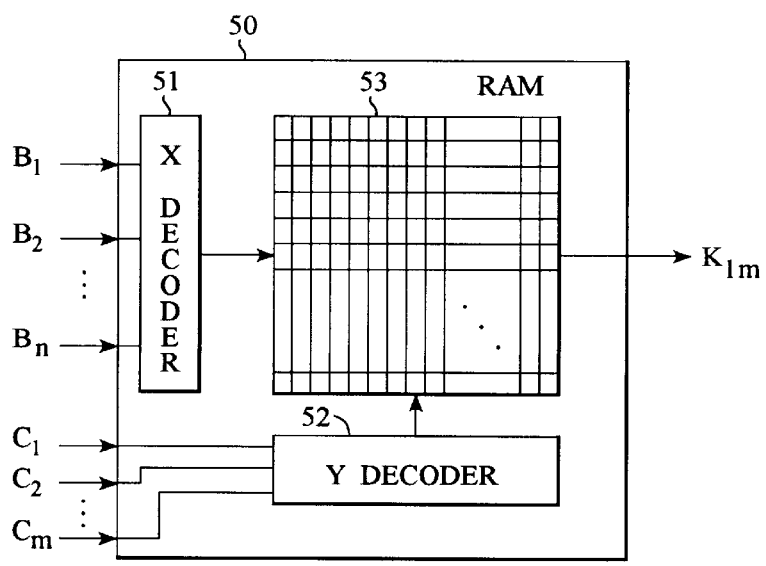
FIG. 5 is a block diagram of a RAM chip for replacing RAM chip 10 of FIG. 3 in a variation on the system of FIG. 3.
Figure 7:
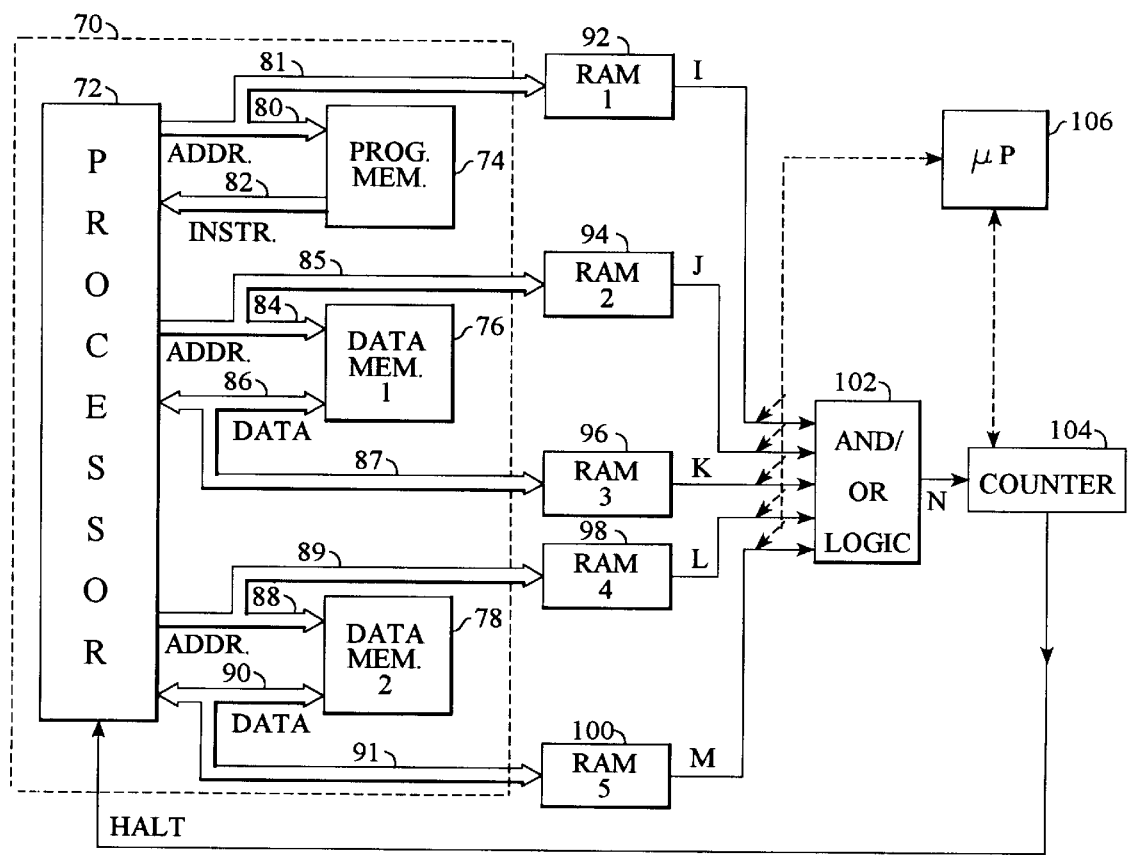
FIG. 7 is another preferred embodiment of the system of the invention, including RAM chips 92–100, logic circuitry 102, and timer 106 (for generating a breakpoint signal) and digital signal processor chip 90.

In another embodiment of the inventive system, RAM chip 50 of FIG. 5 replaces RAM chip 30 of FIG. 3 (or one or more of RAM chips 92–100 of FIG. 7). RAM chip 50 includes memory cell array 53 (comprising an N×Z array of memory cells, where N and Z are integers greater than one). One binary bit can be stored in each cell of array 53. RAM chip 50 also includes X address decoder (row selection) unit 51 and Y address decoder (column selection) unit 52.

DSP 20 may be monitored by RAM 50 instead of RAM 30 and may assert status bit signals $B_1$–$B_N$ and $C_1$–$C_Z$ to RAM 50. Each of the status bit signals has a value which is variable with time. Status bit signals $B_1$–$B_N$ are supplied in parallel to X decoder unit 51 of RAM 50 as an N-bit address signal, and status bit signals $C_1$–$C_Z$ are supplied in parallel to Y decoder unit 52 as a Z-bit address signal. At any instant, bit signals $B_1$–$B_N$ determine an N-bit binary value ($B_1$ determines the most significant bit thereof and $B_N$ determines the least significant bit thereof), which corresponds to the address of one row of cells of array 53 and bit signals $C_1$–$C_Z$ determine a Z-bit binary value ($C_1$ determines the most significant bit thereof and $C_Z$ determines the least significant bit thereof), which corresponds to the address of one column of cells of array 53. The N-bit binary value of signals $B_1$–$B_N$ at any instant of time is also indicative of an operating condition of DSP 20 (the operating condition determined by the state or condition of the N nodes or elements of DSP 20 from which signals $B_1$–$B_N$ originate), and the Z-bit binary value of signals $C_1$–$C_Z$ at any instant of time is indicative of another operating condition of DSP 20 (the operating condition determined by the state or condition of the Z nodes or elements of DSP 20 from which signals $C_1$–$C_Z$ originate). Decoder units 51 and 52 select a different cell of array 53 in response to each pair of binary values determined by signals B–$B_N$ and $C_1$–$C_Z$ RAM 50 asserts the contents of the selected cell (binary signal $K_{lm}$) to DSP 20 as a breakpoint signal. DSP 20 halts an operation (or some or all operations) of DSP 20 in response to each such breakpoint signal having a particular value. Breakpoint signal $K_{lm}$ has a value determined by one of M×Q possible combinations of the bits of the address signals, where $M=2^N$ and $Q=2^Z$. Thus the value of breakpoint signal $K_{lm}$ is indicative of one of M×Q possible operating conditions of DSP 20.

Use of a memory circuit whose cell array comprises multiple columns of cells (e.g., a cell array comprising Z columns, each column comprising N cells) allows the inventive system to produce a breakpoint signal indicative of a larger set of status bits than it could if a cell array comprising only one such column (comprising N cells) were used. High capacity RAM chips are commercially available (at low cost). It will often be preferable to implement the memory circuit of the invention using the least expensive combination of commercially available RAM chips (which may consist of one or more RAM chips) that includes a sufficient number of cells for storing a desired amount of data (e.g., one bit) for each possible set of status bit signals asserted in parallel (as one or more address signals) to the memory circuit. For example, if N×Z status bit signals are asserted in parallel to the memory circuit, it is typically preferable to implement the memory circuit as a single RAM chip (having Z columns of N cells, or one column of N×Z cells) rather than Z RAM chips (each having one column of N cells) if the one-chip implementation can be implemented at lower cost than the Z-chip implementation.

Figure 6:
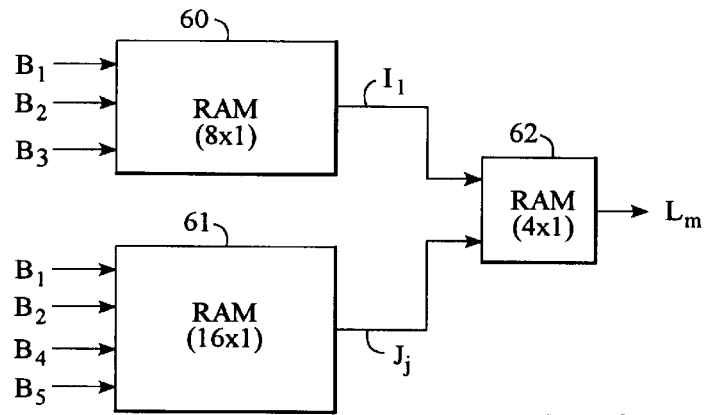
FIG. 6 is a block diagram of multi-chip RAM circuitry, for replacing RAM chip 10 of FIG. 3 in a variation on the system of FIG. 3.

In yet another alternative embodiment, the multi-chip RAM circuitry of FIG. 6 replaces RAM circuitry 41–43 of FIG. 4 (or one or more of RAM chips 92–100 of FIG. 7). The FIG. 6 circuit includes a first stage of RAM circuitry and a second stage of RAM circuitry: the first stage consists of a first RAM chip 60 (including an 8×1 array of memory cells), and a second RAM chip 61 (including a 16×1 array of memory cells); and the second stage consists of RAM chip 62 (including a 4×1 array of memory cells).

As in the FIG. 4 embodiment, bit signals $B_1$, $B_2$, and $B_3$ are asserted in parallel from a processor 40 as an address signal to RAM 60, and in response RAM 60 asserts the contents (binary signal $I_i$) of the cell selected by each such address signal. Similarly, bit signals $B_1$, $B_2$, $B_4$, and $B_5$ are asserted in parallel from processor 40 as an address signal to RAM 61, and in response RAM 61 asserts the contents (binary signal $J_j$) of the cell selected by each such address signal. Signals $I_i$ and $J_j$ are supplied as a two-bit address signal to RAM 62, and in response RAM 62 asserts the contents (binary signal $L_m$, where m=1, 2, 3, or 4) of the cell selected by such address signal. Since the memory array of RAM 60 has eight cells (each selected by a different value of a 3-bit address signal) and that of RAM 61 has sixteen cells (each selected by a different value of a 4-bit address signal), breakpoint signal $L_m$ has a value determined by one of 128 possible combinations of the bits of the address signals from processor 40, and thus the value of breakpoint signal $L_m$ is indicative of one of 128 possible operating conditions of processor 40.

Variations on the two-stage embodiment of FIG. 6 can differ in one or more of the following respects from the circuitry shown in FIG. 6: additional stages of RAM circuitry can be included, each stage of RAM circuitry can include any desired number of RAM circuits, and each RAM circuit in each stage can include any desired number of memory cells.

FIG. 7 is another embodiment of a breakpoint system of the invention, which includes digital signal processing system 70. The DSP system 70 includes a processor 72 that accesses instructions over an instruc- tion bus 82 from a program memory 74 by means of address signals transmitted over an address bus 80. The processor 72 also accesses data from data memories 76 and 78 over data buses 86 and 90 by means of address signals transmitted over address buses 84 and 88 to the respective memories 76 and 78. The breakpoint unit includes RAM chips 92, 94, 96, 98, and 100, logic circuitry 102, and a counter 104 for generating a breakpoint signal. The breakpoint signal is a binary signal (output from counter 104) having either a "halt" value or a "no halt" value, which is asserted to DSP 90.

Each of RAM chips 92, 94, 96, 98 and 100 has a memory cell array, and each outputs a data value from a selected cell of its array to logic circuit 102 in response to a multi-bit address signal from DSP 90. In particular, the RAM chips 92, 94, 96, 98 and 100 monitor the signals on buses 81, 85, 87, 89 and 91 corresponding to the address and data signals from internal buses 80, 84, 86, 88 and 90. Thus, accessing of the program and data memories 74, 76 and 78 by the DSP system 70 are monitored for predetermined conditions. Each cell of the array of each RAM chip can be programmed by writing data thereto from a microprocessor 106 (during programming and reprogramming, microprocessor 106 also supplies the appropriate address signals to each RAM chip being programmed). Whenever desired, microprocessor 106 can reprogram the memory cell array of all or selected ones of the RAM chips with a different array of data values. Typically, one binary bit is stored in each cell of each memory array.

Each signal supplied from DSP system 70 to RAMs 92–100 consists of a plurality of signal bits, each bit being indicative of the present state or condition within DSP system 70. At any instant, the signal bits determine a multi-bit binary value which corresponds to the address of one cell of the cell array of one of RAMs 92–100. Decoder circuitry within each RAM selects a different cell of the RAM's array in response to each multi-bit binary value determined by the signal bits received at the RAM inputs, and the RAM outputs the contents (typically a single binary bit) of the selected cell to combinatorial logic circuitry 102. Circuitry 102 includes a sufficient number of AND gates and/or OR gates to generate a single binary bit $K_m$ indicative of a desired logical combination of the data input to circuitry 102 from RAMs 92–100. A particular level of binary bit $K_m$ (a level indicative of a logical one or zero) triggers a counter 104.

In response to being triggered a certain number of times, the counter (or other means for generating a signal at a predetermined time after assertion of the trigger signal) 104 asserts a breakpoint signal (preferably, the predetermined time can be controlled by assertion of appropriate control signals from microprocessor 106 to counter 104). DSP system 70 halts some or all of its operations in response to each such breakpoint signal having a "halt" value. In one example, in response to binary breakpoint signal asserted at the output of counter 104 having a level indicative of a logical "1", the system 70 halts some or all of its operations.

In alternative embodiments of the inventive system, DSP 20 or 70 is replaced by some other processing circuit or system which outputs signal bits that are monitored by the memory-based breakpoint unit, and which includes means for processing a breakpoint signal generated by the memory circuit in response to the status bits. An example of such a processing circuit or system is an integrated circuit which includes a state machine (rather than a program memory and program control unit as in the above-described DSP) for asserting a sequence of internal control signals in response to an instruction from an external device.

The methods implemented by the systems described with reference to FIGS. 3–7 (and variations thereon) are within the scope of the invention. In a preferred embodiment, the method of the invention includes the steps of:

(a) asserting N status bits (where N is an integer greater than one and each status bit is indicative of a state of a first circuit (indicative of a state or operating condition of a node or element of the first circuit) to a memory circuit including an array of memory cells; and (b) reading first data for determining a value of a breakpoint signal from a selected one of the cells in response to at least a subset of the N status bits.

Optionally, the method also includes the steps of:

(c) reading second data for determining the value of the breakpoint signal from another one of the cells in response to a second subset of the N status bits; and (d) processing the first data and the second data in logic circuitry to generate the breakpoint signal with said value.

Alternatively, the first data generated in step (b) is the breakpoint signal with said value.

In another class of alternative embodiments, step (b) is performed by asserting said subset of the N status bits as address bits to a memory circuit in a first stage of memory circuits, and the method also includes the steps of:

(c) reading second data for determining the value of the breakpoint signal from another one of the cells in response to assertion of a second subset of the N status bits to a second memory circuit in the first stage of memory circuits; and (d) asserting the first data and the second data as address bits to a third memory circuit in a second stage of memory circuits, and in response, reading the breakpoint signal with said value from the third memory circuit.

Preferably, the method also includes the steps of: (e) asserting the breakpoint signal to the first circuit, and (f) halting an operation of the first circuit in response to a first value of the breakpoint signal.

What is claimed:

1. A method of generating a breakpoint signal for controlling operation of a first circuit, said method including the steps of:

(a) asserting at least two status bits from the first circuit to a memory circuit, where each of the status bits is indicative of a state of the first circuit, and where the memory circuit includes a first stare with at least a first memory and a second memory, said first and second memories having respective first and second arrays of memory cells addressable by first and second subsets of the status bits, the subsets of the status bits being asserted as address bits to said first and second memories;

(b) reading first data for determining a value of the breakpoint signal from a selected one of the cells of the first array of memory cells in response to the first subset of the status bits asserted as address bits to said first memory;

(c) reading second data for determining the value of the breakpoint signal from a selected one of the cells of the second array of memory cells in response to the second subset of the status bits asserted as address bits to said second memory;

(d) asserting the first data and the second data as address bits to a third memory in a second stage of the memory circuit, and reading third data from a selected cell of a third array of memory cells included in said third memory in response to said asserted first and second data; and (e) processing said third data to generate the breakpoint signal with said value.

2. The method of claim 1, wherein the third data is indicative of a binary value, and wherein step (e) comprises asserting the third data to the first circuit as the breakpoint signal, where the value of the breakpoint signal is said binary value.

3. The method of claim 1, wherein the first circuit is a digital signal processor, and wherein the method also includes the steps of:

(f) asserting the breakpoint signal with said value to the digital signal processor; and (g) halting an operation of the digital signal processor in response to said breakpoint signal.

4. The method of claim 1, wherein the first circuit is a microcontroller.

5. The method of claim 1, wherein the first circuit is a logic analyzer.

6. The method of claim 1, wherein the first, second and third memories are random access memory circuits, and wherein the method also includes the step of:

before step (a), programming the cells of the first, second and third arrays with desired data values, wherein the first, second and third data are included as said desired data values.

7. The method of claim 1, wherein step (e) comprises:

asserting the third data to a counter, said counter being incremented wherever said third data has a value that corresponds to a breakpoint condition for said status bits from said first circuit, repeating steps (a)–(d), and generating a breakpoint signal after a predetermined number of breakpoint conditions have occurred, as determined by said third data asserted to said counter.

8. A system, including:

a first circuit, including processing means and means for asserting at least two status bits indicative of states of said first circuit; and memory means connected to the first circuit for receiving the status bits and generating a breakpoint signal having a value determined by the status bits, wherein the memory means includes a first stage of memory circuitry and a second stage of memory circuitry, the first stage of memory circuitry including a first memory having a first array of memory cells and first means for reading first data from a selected one of the cells of the first array in response to at least a subset of the status bits, the first stage of memory circuitry also including a second memory having a second array of memory cells and second means for reading second data from a selected one of the cells of the second array in response to at least a subset of the status bits, the second stage of memory circuitry connected to the first stage for receiving the first and second data therefrom, the second stage including a third memory having a third array of memory cells and third means for reading third data from a selected one of the cells of the third array in response to the first and second data, the second stage also having means for processing the third data to generate the breakpoint signal with said value.

9. The system of claim 8, wherein the first, second and third memories of the memory means are random access memories, each implemented as an integrated circuit, the third data is the breakpoint signal, the third data is indicative of a binary value, the value of the breakpoint signal is said binary value, and the processing means of the second stage of said memory means asserts said breakpoint signal with said value to said first circuit.

10. The system of claim 8, wherein each of the status bits is a binary bit, the first, second and third memories of the memory means are random access memories, each implemented as a integrated circuit, the first and second means for reading each receive and treat status bits as address bits corresponding to selected cells of the respective first and second arrays of cells of the first and second memories, the third means for reading receives and treats first and second data as address bits corresponding to a selected cell of the third array of cells of the third memory, and the first, second and third memories are single-bit wide memories each providing a one-bit output as said respective first, second and third data.

11. The system of claim 8, wherein each of the status bits is a binary bit, the first, second and third memories of the memory means are random access memories, each implemented as an integrated circuit, and at least one of said memories of said memory means is a multibit-wide memory providing a multibit output defining a plurality of separate classes of conditions being monitored via said status bits.

12. The system of claim 8, wherein the first circuit is a digital signal processor, the memory means includes means asserting the breakpoint signal with said value to the digital signal processor, and said digital signal processor includes means for halting an operation of the processing means in response to the breakpoint signal with said value.

13. The system of claim 8, wherein the first circuit is a microcontroller.

14. The system of claim 8, where the first circuit is a logic analyzer.

15. The system of claim 8, wherein the first, second and third memories are random access memories, and wherein the system also includes:

means for programming the cells of the first, second and third memories with the desired data values, wherein the first, second and third data are included as said desired data values.

16. The system of claim 8, further comprising a counter connected to said third memory of said memory means to receive said third data, said counter incrementing in response to said third data corresponding to a breakpoint condition for said status bits from said first circuit, said counter having an output providing a breakpoint signal after a predetermined number of breakpoint conditions have occurred, as determined by said counter being incremented to said predetermined number.

* * * * *